(12) United States Patent
Saecker

(10) Patent No.: US 12,730,017 B2
(45) Date of Patent: Sep. 8, 2026

(54) DIAGNOSIS OF A THERMOMETER

(71) Applicant: Endress+Hauser Wetzer GmbH+Co. KG, Nesselwang (DE)

(72) Inventor: Dietmar Saecker, Nesselwang (DE)

(73) Assignee: Endress+Hauser Wetzer GmbH+Co. KG, Nesselwang (DE)

( * ) Notice: Subject to any disclaimer, the term of this patent is extended or adjusted under 35 U.S.C. 154(b) by 324 days.

(21) Appl. No.: 18/291,279

(22) PCT Filed: Jul. 4, 2022

(86) PCT No.: PCT/EP2022/068451
§ 371 (c)(1),
(2) Date: Jan. 23, 2024

(87) PCT Pub. No.: WO2023/006347
PCT Pub. Date: Feb. 2, 2023

(65) Prior Publication Data

US 2024/0344903 A1 Oct. 17, 2024

(30) Foreign Application Priority Data

Jul. 29, 2021 (DE) ..................... 10 2021 119 770.8

(51) Int. Cl.
*G01K 1/06* (2006.01)
*G01K 1/08* (2021.01)
(Continued)

(52) U.S. Cl.
CPC ............. *G01K 15/007* (2013.01); *G01K 1/08* (2013.01); *G01K 1/16* (2013.01); *G01K 7/16* (2013.01)

(58) Field of Classification Search
CPC .......... G01K 15/007; G01K 1/08; G01K 1/16; G01K 7/16; G01K 13/02; G01K 15/00; G08B 21/18; G08B 21/20; G08B 23/00
See application file for complete search history.

(56) References Cited

U.S. PATENT DOCUMENTS 10,466,137 B1 11/2019 Billman et al.
2006/0002449 A1* 1/2006 Kendall ................. G01K 1/125 604/179
2018/0364110 A1* 12/2018 Irrgang ................ G01K 15/002

FOREIGN PATENT DOCUMENTS

DE 19747273 A1 4/1999
DE 102004032561 B3 2/2006
(Continued)

OTHER PUBLICATIONS

Computer translation of DE_102004035014_A1 (Year: 2026).*
(Continued)

*Primary Examiner* — Randy W Gibson
(74) *Attorney, Agent, or Firm* — Gil M. Repa; Endress+Hauser (USA) Holding, Inc.

(57) ABSTRACT

The invention relates to an apparatus for determining and/or monitoring temperature of a medium, such as an electrically conductive medium, in a containment, comprising a measuring insert, in which at least one temperature sensor is arranged, and a protective tube, which serves for contacting the medium and for accommodating the measuring insert. According to the present disclosure, the apparatus further comprises at least one diagnostic unit, which includes at least a first electrode of a first material, which first electrode is located, at least partially, in an internal volume of the apparatus.

13 Claims, 3 Drawing Sheets

(51) Int. Cl.

| | |
|---|---|
| ***G01K 1/16*** | (2006.01) |
| ***G01K 7/16*** | (2006.01) |
| ***G01K 15/00*** | (2006.01) |

(56) References Cited

FOREIGN PATENT DOCUMENTS

| | | | | | |
|---|---|---|---|---|---|
| DE | 102004035014 | A1 | | 2/2006 | |
| DE | 102010040039 | A1 | | 3/2012 | |
| DE | 102014005069 | A1 | * | 10/2015 | ........... G01N 17/046 |
| DE | 102019126516 | A1 | | 4/2021 | |
| DE | 102019128621 | A1 | | 4/2021 | |
| EP | 0441659 | A1 | * | 8/1991 | ......... G01N 27/4165 |
| EP | 2176724 | B1 | | 1/2012 | |
| EP | 3118583 | B1 | | 3/2019 | |

OTHER PUBLICATIONS

Computer translation of DE_102010040039_A1 (Year: 2026).*
Computer translation of DE_102019126516_A1 (Year: 2026).*
Computer translation of DE_102019128621_A1 (Year: 2026).*
Computer translation of EP_2176724_B1 (Year: 2026).*
Computer translation of EP_3118583_A1 (Year: 2026).*
Computer translation of DE_102014005069_A1 (Year: 2026).*
Computer translation of DE_19747273_A1 (Year: 2026).*

* cited by examiner

DIAGNOSIS OF A THERMOMETER

CROSS-REFERENCE TO RELATED APPLICATIONS

The present application is related to and claims the priority benefit of DPMA Patent Application No. 10 2021 119 770.8, filed on Jul. 29, 2021, and International Patent Application No. PCT/EP2022/068451, filed Jul. 4, 2022, the entire contents of which are incorporated herein by reference.

TECHNICAL FIELD

The invention relates to an apparatus for determining and/or monitoring temperature of a medium, especially an electrically conductive medium, in a containment using a diagnostic function.

BACKGROUND

Thermometers are known in a wide variety of embodiments in the state of the art. Thus, there are thermometers, which for measuring temperature reference the expansion of a liquid, gas or solid of known coefficient of expansion, or such, which relate the electrical conductivity of a material or a variable derived therefrom (such as, for example, the electrical resistance in the case of application of resistance elements) with the temperature, or use the thermoelectric effect, in the case of thermocouples. In contrast, in the case of radiation thermometers, especially pyrometers, the heat radiation of a substance is utilized for determining the temperature. The measuring principles of these measuring devices have been described in a large number of publications.

In the case of temperature sensors in the form of resistance elements, there are, among others, so-called thin film- and thick film sensors, as well as so-called hot conductors (also known as NTC thermistors). In the case of a thin film sensor, especially a Resistance Temperature Detector (RTD), for example, a sensor element is used equipped with connection wires and applied on a substrate, wherein the rear face of the support substrate is, as a rule, coated with metal. Used as sensor 20) elements are so-called resistance elements, for example, in the form of platinum elements, which are obtainable commercially, among others, under the designations PT10, PT100, and PT1000.

In the case of temperature sensors in the form of thermocouples, in turn, the temperature is determined by a thermovoltage, which occurs between unilaterally connected thermocouple wires of different materials. Applied as temperature detector for temperature measurement are usually thermocouples of the DIN standard IEC584, e.g. thermocouples of type K, J, N, S, R, B, T or E. However, also other material pairs are possible, especially such having a measurable Seebeck effect.

The temperature sensors are frequently part of a measuring insert, which is introducible, for example, into an immersion body, e.g. protective tube, immersible in the medium. The protective tube fulfills, thus, in principle, the function of a housing, which protects the measuring insert from the process environment, e.g. aggressive media, forces and/or high pressures and/or temperatures in a process. The protective tubes are, in turn, typically introduced into a port of a containment, e.g. a container or a measuring tube.

Especially for safety-critical applications, diagnosis of a measuring device is highly important. For example, do safety precautions need to be performed for assuring a seal between process and environment. In case, for example, medium from the process enters into an internal volume of the protective tube, it must be assured that such medium cannot reach a region, in which an electronics of a sensor is arranged, and/or the environment.

In this connection, known, for example, from EP 2343514 A1 is an installation assembly for a rod shaped measuring insert, in the case of which safety chambers are provided for mutually connectable housing parts. Additionally, a sealing means is provided, which serves to seal the second safety chamber from the first safety chamber especially pressure- and/or liquid tightly in the case of measuring insert introduced into a mounting housing.

In DE102011088736A1, in turn, a sealing means for accommodating a measuring insert is described, comprising a piston, a socket and at least one sealing element, wherein the piston and the socket serve for accommodating the measuring insert in bores in the piston and in the socket. In such case, the piston is interactively connected with the socket in such a manner that a pressure exerted by the piston on the socket serves to deform the sealing element and, as a result, provide a sealing action, in order, in the case of measuring insert being present, to seal the bore, especially liquid- or gas tightly. In order supplementally to enable reporting of an actual sealing event, it is known from EP03118583B2 supplementally to use a fault detection unit, which comprises a sensor element for detecting a failure condition of the sealing means.

All these sealings apparatuses enable the detecting of a leakage before, in given cases aggressive or toxic, media can escape from the process. The proposed sealing mechanisms operate, however, based on pressure difference being above a predeterminable limit value. However, a leakage in a protective tube is not always associated with such a pressure difference. It would, thus, be desirable to be able to detect damage to a protective tube independently of pressure difference.

SUMMARY

Therefore, an object of the invention is to provide an apparatus enabling improved diagnosis of protective tubes of thermometers.

The object is achieved by an apparatus for determining and/or monitoring temperature of a medium, especially an electrically conductive medium, in a containment, comprising a measuring insert, in which at least one temperature sensor is arranged, and a protective tube, which serves for contacting the medium and for accommodating the measuring insert. According to the invention, the apparatus further comprises a diagnostic unit, which includes at least a first electrode of a first material, which first electrode is located, at least partially, in an internal volume of the apparatus.

The first electrode is part of a galvanic cell. Such is formed together with a second electrode or an additional component of the apparatus, for example, a wall, which encloses an internal volume of the apparatus, or a component, which extends into an internal volume of the apparatus. In the case, in which medium enters into the apparatus, for example, due to damage of the protective tube, a voltage results in the galvanic cell, thus, between the first electrode and the second electrode or the additional component of the apparatus. The presence of a voltage in the galvanic cell can, thus, serve for diagnosis of the apparatus as regards damage of the protective tube. For example, an electronics of the apparatus can be embodied, in the case of a detection of a voltage in the galvanic cell, to output a diagnostic signal signaling the entry of medium into the apparatus.

In an embodiment, the apparatus further comprises a neck tube for connecting with the protective tube. The neck tube serves for connecting an electronics with the measuring insert. In given cases, the apparatus further comprises a connecting element for connecting with the electronics or with a process connection on the containment.

In an additional embodiment, the diagnostic unit, especially the first electrode, is arrangeable or arranged, at least partially, in an internal volume of the protective tube. The diagnostic unit can either be fixed in the protective tube or integrated into the measuring insert as a fixed component of the apparatus, or be embodied in such a manner that it is introducible releasably into the protective tube.

Advantageously in this connection, the diagnostic unit, especially the first electrode, is arrangeable or arranged in an end region of the protective tube toward the medium in the installed state of the apparatus. The diagnostic unit is, in such case, arranged in a region, in which also the temperature sensor is arranged.

In an additional embodiment, the diagnostic unit, especially the first electrode, is arrangeable or arranged, at least partially, in an internal volume of the neck tube.

It is understood, however, that also other positions of the diagnostic unit relative to the apparatus, or relative to an internal volume of the apparatus, are possible and likewise fall within the scope of the invention. Also, it is an option to arrange a plurality of diagnostic units at different positions within or on the apparatus.

Another embodiment of the apparatus of the invention includes that the diagnostic unit, especially at least the first electrode, is surrounded by an electrically non-conductive, water soluble, protective element. In this way, it can be prevented that a voltage in the galvanic cell is produced by a condensation within the apparatus and lead to a faulty diagnosis. In the case of entering medium, the protective element is dissolved, and a voltage arises in the galvanic cell. The protective element can be made of a sugar, for example.

In an embodiment, the apparatus further comprises a modular sealing means for an installation means for accommodating the measuring insert. The modular sealing means can especially be a sealing means according to EP03118583B2, DE102011088736A1 or EP 2343514 A1. Comprehensive reference is taken to all of these documents in the context of the present invention. The diagnostic unit can especially be the measuring element described in EP03118583B2.

In a preferred embodiment, the first material differs from a material of the protective tube or of the neck tube, especially relative to electrochemical properties. Such is especially advantageous when the galvanic cell is formed by the first electrode and a wall of the protective tube or neck tube.

In an additional preferred embodiment, the diagnostic unit comprises at least the first and a second electrode, wherein the first material of the first electrode and a second material of the second electrode differ from one another, especially relative to their electrochemical properties. In such case, the galvanic cell, i.e. the diagnostic unit, comprises two electrodes, across which an electrical voltage lies in the case of entering medium.

Advantageously, the apparatus further comprises a securement means for securing, especially releasably securing, the diagnostic unit. The diagnostic unit can, on the one hand, be securable within the protective tube or neck tube and be located completely in an internal volume of the apparatus. In other embodiments, the diagnostic unit and other components of the apparatus can, however, also be embodied in such a manner that the diagnostic unit is introducible from the outside into the apparatus, for example, into the neck tube, for example, via an opening in a component of the apparatus, and securable to the apparatus by means of the securement means.

Advantageously in this connection, the securement means is a means for producing a screwed connection, a clamped connection or a welded connection.

Another embodiment of the apparatus includes that the diagnostic unit further comprises a housing, in which the first or the first and second electrodes is/are, at least partially, arranged, wherein the first or the first and second electrodes protrude(s), at least partially, out of the housing.

In such case, the housing advantageously comprises a securement means complementary to that of the apparatus.

Likewise advantageously, the housing of the diagnostic unit is filled, at least partially, with a filling, especially a potting compound, in which the first or the first and second electrodes are, at least partially, located.

It is to be noted here that the various embodiments of an apparatus of the invention can be combined with one another to the extent desired.

BRIEF DESCRIPTION OF THE DRAWINGS

The present disclosure will now be explained in greater detail based on the appended drawing, the figures of which show as follows.

DETAILED DESCRIPTION

Figure 1:
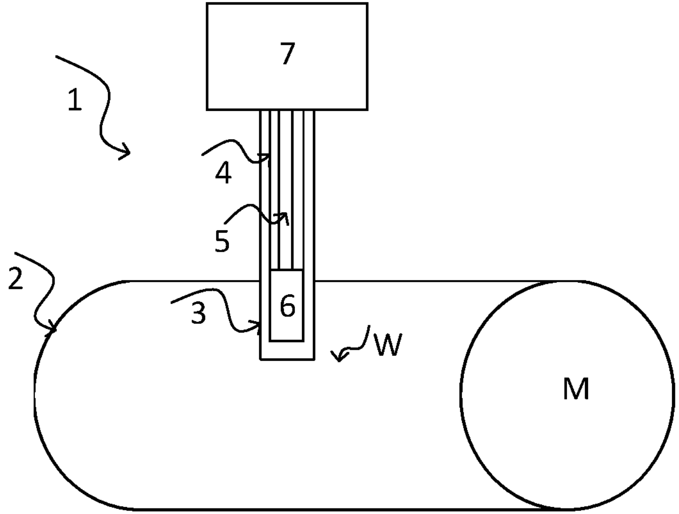
FIG. 1 shows a schematic view of a thermometer according to the state of the art.

In the figures, equal elements are provided with equal reference characters. The embodiments of the different figures are, furthermore, combinable with one another to the extent desired.

Shown in FIG. 1 is a schematic view of a thermometer 1 according to the state of the art for registering temperature T of a medium M in a containment 2 in the form of a pipeline. The thermometer includes a protective tube 3, which is immersed in the medium M and which is introducible into the containment 2, for example, via a process connection 2*a* (not shown in FIG. 1).

Thermometer 1 further includes a measuring insert 4 and an electronics 7. The measuring insert, in turn, includes a temperature sensor 6, which in the present case is provided by a temperature sensitive element in the form of a resistance element. Temperature sensor 6 is electrically contacted and connected with the electronics 7 via the connection lines 5. While the thermometer 1 illustrated in FIG. 1 is embodied in compact construction with integrated electronics 7, in the case of other thermometers 1, the electronics 7 can also be arranged separately from the measuring insert 4. Also, the temperature sensor 6 does not necessarily need to be a resistance element and the number of connection lines 5 does not necessarily need to be two. Rather, the number of connection lines 5 can be suitably selected, depending on applied measuring principle and applied temperature sensor 6.

In the case of safety-critical applications, for instance, in the case of working with aggressive and/or toxic media, it is of great importance, to detect damage to the protective tube 3 early, in order to prevent that medium M can escape from the process, thus from the containment 2. In order to enable an early, exact and universal diagnosis according to the invention, a diagnostic unit 8 is used. Various preferred embodiments of a thermometer 1 having such a diagnostic unit 8 are shown in FIG. 2.

Figure 2A:
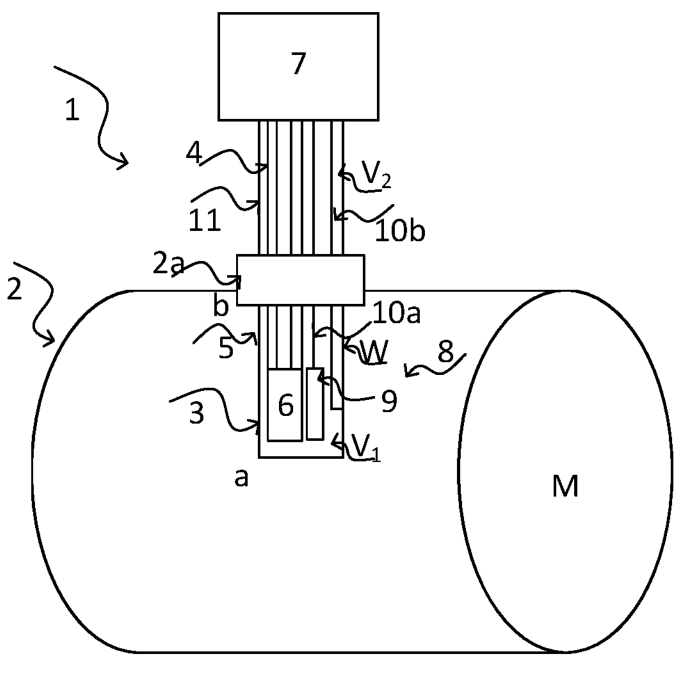
FIG. 2 shows preferred embodiments of an apparatus of the present disclosure having a diagnostic unit.

FIG. 2*a* shows, by way of example, a first embodiment of an apparatus 1 of the invention. The diagnostic unit 8 includes a first electrode 9 of a first material, which is contacted via the connection line 10*a*, and a connection line 10*b*, which is connected with the wall W of the protective tube 3. In such case, the first material differs from a material of the protective tube 3, especially differs relative to electrochemical properties.

In the case of the embodiment shown in FIG. 2*a*, the first electrode 9 and the wall W of the protective tube 3 form a galvanic cell in an internal volume $V_1$ of the protective tube. In the case, in which medium M enters into the protective tube, a voltage results between the connection lines 10*a* and 10*b*. If such a voltage is detected by the electronics 7, a corresponding diagnostic signal can be output, for example.

The diagnostic unit 8 in such case is arranged in an end region of the protective tube 3 near the medium M, where the temperature sensor 6 is likewise located. In other embodiments, the diagnostic unit can be arranged in a medium M far region b of the protective tube 3, or in an internal volume $V_2$ of the neck tube 11.

In the embodiment of FIG. 2*a*, the first electrode 9 is introduced into the protective tube 3 in the form of a separate component. In other embodiments, the first electrode 9 can, for example, also be secured on or to the measuring insert 4 or another component of the apparatus 1 extending inwardly into the internal volume V. Finally, also a plurality of diagnostic units 8, thus a plurality of galvanic cells, can be provided at different positions within the apparatus 1.

Figure 2B:
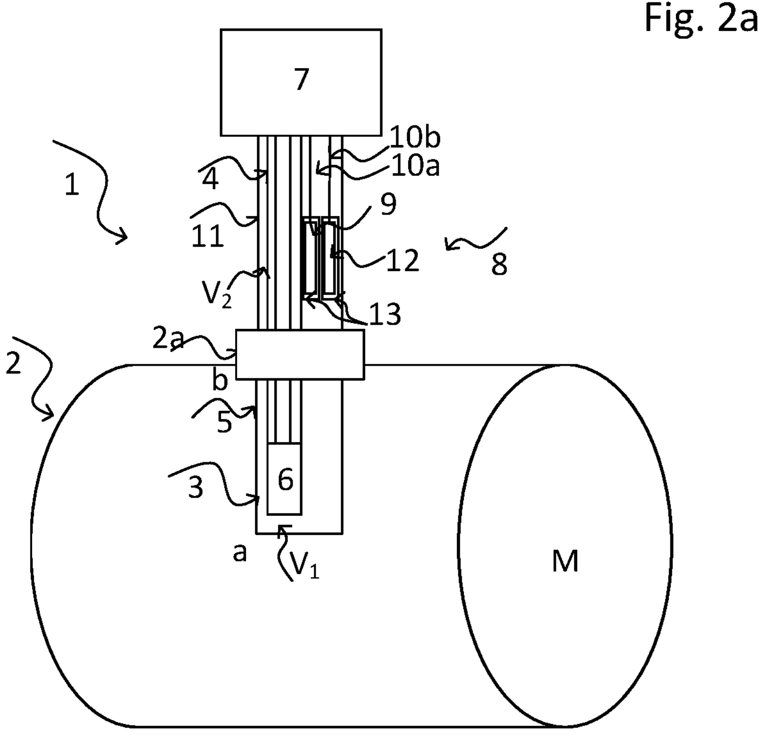

In the case of the embodiment of FIG. 2*b*, the diagnostic unit 8 comprises a first electrode 9 and a second electrode 12, which are different materials, especially different as regards their electrochemical properties. The two electrodes 9,12 are introduced as separate components into the internal volume $V_2$ of the neck tube 11 and contacted with the electronics 7 via the connection lines 10*a*, 10*b*, respectively. The two electrodes 9,12 are, additionally, surrounded by a protective element 13, which prevents that in the case of a condensation in the internal volume $V_2$ of the neck tube a voltage occurs in the galvanic cell formed by the two electrodes 9,12.

Figures 3A, 3B:
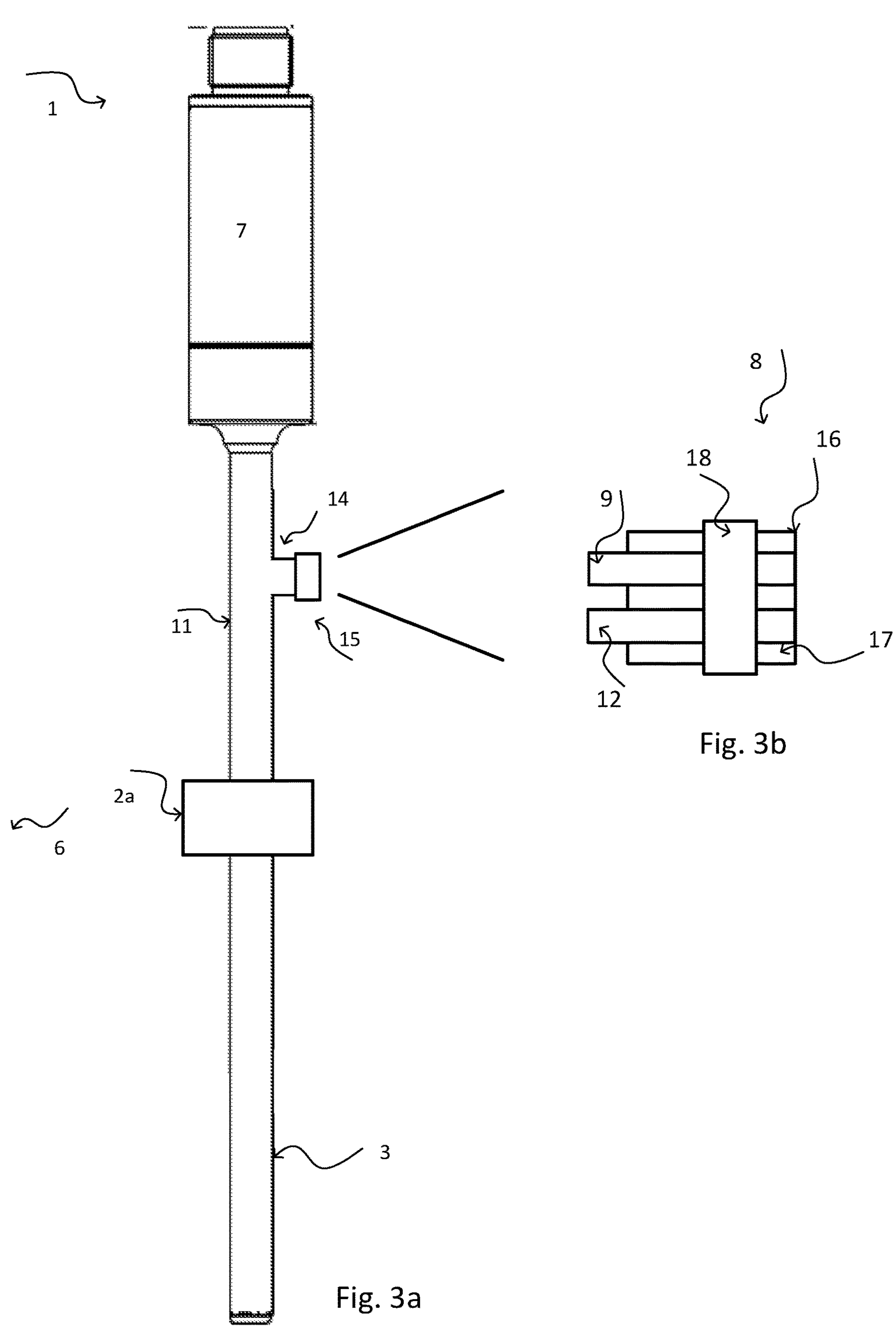
FIG. 3 shows by way of example, an embodiment of a diagnostic unit for releasable securement to a component of the thermometer.

Another embodiment of a diagnostic unit 8 of the invention is shown in FIG. 3. FIG. 3*a* shows a thermometer 1 having a protective tube 3 and a neck tube 11. The neck tube 11 includes a port 14 having a securement means 15, into which the diagnostic unit 8 is introducible.

A detail view of the diagnostic unit 8 is shown in FIG. 3*b*. Diagnostic unit 8 comprises a housing 16, which is filled with a filling, here in the form of a potting compound 17 and in which the first electrode 9 and second electrode 12 extend. Housing 16, in turn, comprises a securement means 18, which is complementary to the securement means 15 of the neck tube 11, and which serves for securing the diagnostic unit 8 to the neck tube 11. In other embodiments, the diagnostic unit 8 can also be securable to other components of the apparatus 1.

The invention claimed is:

1. An apparatus for determining and/or monitoring temperature of a medium in a containment, comprising a measuring insert, in which at least one temperature sensor is arranged, and a protective tube, which serves for contacting the medium and for accommodating the measuring insert, wherein the apparatus further comprises at least one diagnostic unit, which includes at least a first electrode of a first material, which first electrode is located, at least partially, in an internal volume of the apparatus, and wherein a galvanic cell is formed by the first electrode and one of the following:

a second electrode comprised by the diagnostic unit, wherein the first material and a second material of the second electrode differ from one another in terms of electrochemical properties;

the protective tube, wherein the first material differs from a material of the protective tube in terms of electrochemical properties; or a neck tube for connecting with the protective tube, wherein the first material differs from a material of the neck tube in terms of electrochemical properties;

and wherein the apparatus is configured such that upon medium entering the apparatus due to a damage of the protective tube, a voltage in the galvanic cell is generated, thereby enabling the diagnostic unit to detect the damage based on the generated voltage.

2. The apparatus as claimed in claim 1, wherein the diagnostic unit is arrangeable or arranged, at least partially, in an internal volume of the protective tube.

3. The apparatus as claimed in claim 2, wherein the diagnostic unit is arrangeable or arranged in an end region of the protective tube toward the medium in the installed state of the apparatus.

4. The apparatus as claimed in claim 1, wherein the diagnostic unit is arrangeable or arranged, at least partially, in an internal volume of the neck tube.

5. The apparatus as claimed in claim 1, wherein the diagnostic unit is surrounded by an electrically non-conductive, water soluble, protective element.

6. The apparatus as claimed in claim 1, further comprising modular sealing for an installation for accommodating the measuring insert.

7. The apparatus as claimed in claim 1, further comprising a first securement for securing the diagnostic unit.

8. The apparatus as claimed in claim 7, wherein the first securement includes a screwed connection, a clamped connection or a welded connection.

9. The apparatus as claimed in claim 1, wherein the diagnostic unit further comprises a housing, in which the first electrode or the first electrode and second electrode is/are, at least partially, arranged, wherein the first electrode or the first electrode and second electrode protrude(s), at least partially, out of the housing.

10. The apparatus as claimed in claim 8, wherein the housing comprises a second securement complementary to the that of the first securement.

11. The apparatus as claimed in claim 8, wherein the housing of the diagnostic unit is filled, at least partially, with a filling in which the first electrode or the first electrode and second electrode is/are, at least partially, located.

12. The apparatus as claimed in claim 7, wherein the first securement is configured for releasably securing the diagnostic unit.

13. The apparatus as claimed in claim 1, wherein, when the galvanic cell is formed by the first electrode and the second electrode comprised by the diagnostic unit, the first electrode and the second electrode are located, at least partially, in a second internal volume of the protective tube defined by a protective element, wherein the protective element prevents condensation in the second internal volume.

* * * * *